United States Patent
Pujari et al.

[11] Patent Number: 6,158,894
[45] Date of Patent: Dec. 12, 2000

[54] ALL CERAMIC BEARING

[75] Inventors: Vimal Pujari, Northboro; William Collins, Auburn, both of Mass.

[73] Assignee: Saint-Gobain Ceramics & Plastics, Inc., Worcester, Mass.

[21] Appl. No.: 09/362,770

[22] Filed: Jul. 28, 1999

[51] Int. Cl.[7] .................................................. F16C 19/00
[52] U.S. Cl. ..................... 384/492; 384/907.1; 384/913
[58] Field of Search .................................... 384/492, 565, 384/569, 907.1, 913

[56] References Cited

U.S. PATENT DOCUMENTS

| | | | |
|---|---|---|---|
| 4,634,300 | 1/1987 | Takebayaski et al. | 384/548 |
| 4,664,595 | 5/1987 | Tsuji et al. | 415/170 |
| 4,728,582 | 3/1988 | Comans et al. | 428/698 |
| 4,754,494 | 6/1988 | Kumar | 384/112 |
| 4,770,549 | 9/1988 | Rokkaku et al. | 384/492 |
| 4,886,556 | 12/1989 | Suzuki et al. | 264/63 |
| 4,968,158 | 11/1990 | Atkinson et al. | 384/535 |
| 4,975,925 | 12/1990 | Derrickson | 372/58 |
| 5,575,571 | 11/1996 | Takebayashi et al. | 384/492 |

OTHER PUBLICATIONS

H.R. Baumgartner, "Evaluation of Roller Bearings Containing Hot Pressed Silicon Nitride Rolling Elements", Norton Company, Second Army Materials Technology Conference, Ceramics for High Performance Applications, Nov. 13–16, 1973 pp. 1/6.

B. Bhusan, L.B. Sibley, "Silicon Nitride Rolling Bearings for Extreme Operating Conditions", SKF Industries, Inc., ASLE Transactions, vol. 25,4, 1981 pp. 417/428.

H.M. Dalal, J.W. Rosenlieb, L.B. Sibley, "Final Report on Development of Basic Processing Technology For Bearing Quality Silicon Nitride Balls", SKF Industries, Inc, Report No. AL77T057, Dec., 1977, pp. 1–9.

E. Gugel, "A Consideration of some Silicon Nitride Applications", Nitrogen Ceramics, Aug. 1976, pp. 1/7, Netherlands.

G. Hamburg, P. Cowley, R. Valori, "Operation of an All–Ceramic Mainshaft Roller Bearing in a J–402 Gas Turbine Engine", ASLE Lubrication Engineering, vol. 37, 7, pp. 407–415, Jul., 1981.

J.R. Miner, W.A. Grace, "A Demonstration of High–Speed Gas Turbine Bearings Using Silicon Nitride Rolling Elements" ASLE Lubrication Engineering, vol. 37, 8, pp. 462/464, 473–478, Aug. 1981.

M. Blake, "New, Improved Silicon Nitride Vies for High Performance Bearings", Norton Company Materials Engineering, Nov. 1973, pp. 1–4, Reinhold Publishing Co., Inc.

L. Sibley, "Silicon Nitride Bearing Elements For High–Speed High–Temperature Applications", Conference Proceedings No. 323, Tribology Inc. Consultants, Cover page and pp. 1/13.

K.M. Taylor, L.B. Sibley, J.C. Lawrence, "Development of a Ceramic Rolling Contact Bearing For High Temperature Use", Wear, 6 (1963) pp. 226/240.

*Primary Examiner*—Lenard A. Footland
*Attorney, Agent, or Firm*—Thomas M. DiMauro

[57] ABSTRACT

This invention relates to an all-ceramic bearing having wherein the fracture toughness and hardness values of the rings and roller elements are adjusted to produce pseudoplastic contact, high resistance to roller contact fatigue and high resistance to wear.

11 Claims, 1 Drawing Sheet

ALL CERAMIC BEARING

BACKGROUND OF THE INVENTION

Because of their high resistance to both corrosion and rolling contact fatigue, silicon nitride bearing balls (or "roller elements") have replaced steel roller elements in many high performance bearing applications. First generation silicon nitride-based bearings represented only a partial replacement of silicon nitride for steel. That is, these bearings typically comprised a plurality of silicon nitride roller elements housed within an inner steel ring and an outer steel ring. However, over time, the same desire to improve the corrosion and rolling contact fatigue of the inner and outer rings led to the development of the "all ceramic" bearing, in which each of the roller elements, the inner ring and the outer ring comprised ceramics.

Typically, in all-ceramic bearings, the same silicon nitride material has been employed for each component. See, for example, U.S. Pat. No. 5,575,571 and U.S. Pat. No. 4,634,300 (col.3, line 65). One reason for using identical materials in each component is provided in U.S. Pat. No. 4,968,158, which teaches that the bearing and race materials should have the same coefficient of thermal expansion.

The introduction of such "all-ceramic" bearings has not been without problems. U.S. Pat. No. 4,770,549 (Rokkaku) noted that, in some applications, all ceramic bearings in which the roller elements and rings were made of the same material were prone to exfoliation (or "spalling"). Rokkaku teaches a solution of an all-ceramic bearing in which the fracture toughness ($K_{1C}$) of the roller elements exceeds that of the inner and outer rings by about 0.5–2.0 MPa $m^{1/2}$. According to Rokkaku, since the roller elements are more prone to spalling, their rolling contact fatigue ("RCF") lives are improved by having a higher fracture toughness.

In simulation RCF testing of similar materials, although it has been found that although the specific ceramic-ceramic combinations of Rokkaku do in fact have a higher spalling resistance than those combinations of identical materials, these combinations (in which the ball is made of a tougher material) nonetheless display high wear.

The Rokkaku patent discusses above generally used silicon nitride materials having a relatively low fracture toughness (i.e., between 5 and 6 MPa $m^{1/2}$) U.S. Pat. No. 5,575,571 ("Takebayashi") discloses a ceramic-ceramic bearing in which both the roller elements and the race are made of a silicon nitride material having a hardness of about 15 GPa and a fracture toughness of above 6.2 MPa $m^{1/2}$.

Again however, in simulation RCF testing of similar materials, it has been found that although these higher toughness materials do in fact have a higher spalling resistance than those combinations of identical materials having lower toughness, these combinations (of identical high toughness materials) also display high wear.

Thus, in addition to spalling resistance, wear resistance is also a critical factor in the performance of an all-ceramic bearing. In general, it is desirable for a bearing to have low wear because excessive wear causes both a loss of preload and an increase in the ball-race clearance which leads to undesirable sliding. In addition, increasingly worn regions are more prone to spalling as well. In general, the wear of a ceramic-ceramic bearing is a complex function of many variables, including toughness and hardness. All else being equal, the wear resistance of the bearing increases with increased hardness and increased toughness of the contact components. Also generally, an increase in the hardness of a ceramic material generally corresponds to a decrease in its toughness.

Therefore, it is the object of the present invention to provide an all-ceramic bearing having high resistance to both spalling and wear.

SUMMARY OF THE INVENTION

In seeking to improve the performance of the all-ceramic bearing, the present inventors assessed the performance of many different combinations of silicon nitride materials under a very extreme rolling contact fatigue (RCF) test, and found that one new specific combination of materials not only survived the extreme RCF test but also produced an extremely low wear. Moreover, not only is this combination of the present invention apparently discouraged by the art for fear of RCF failure (Rokkaku), but also its superior wear performance over the each of the prior art combinations is not at all suggested (hard-hard). The fact of survival of each of this combination coupled with its superior wear performance represents a remarkable discovery which is a tremendous contribution to the field of ceramic-ceramic bearings.

In particular, the present inventors examined the RCF life and wear resistance of a combination of a high toughness, relatively soft silicon nitride rod and a low toughness, relatively hard silicon nitride ball (which, in practice, corresponds to a high toughness silicon nitride ring and a low toughness silicon nitride roller element). Surprisingly, the present inventors found that this combination of materials survived the RCF test and did not spall. The survival of this combination is particularly surprising in light of the extreme nature of the test and the fact that it represents the essentially an opposite application of the teaching of Rokkaku (who taught using a higher toughness ball in order to prevent spalling). Accordingly, this unexpected finding of survival provides a design freedom which is apparently discouraged by Rokkaku. Moreover, the present inventors also unexpectedly found that this combination produced exceedingly low wear. That is, its wear resistance was found to be up to about an order of magnitude greater than the state of the art low toughness-low toughness combination, about an order of magnitude greater than that of the Rokkaku high toughness roller element, low toughness ring combination, and about four times that of the high toughness-high toughness combination of Takebayashi. This result was very surprising and is in fact discouraged by the conventional teachings in this field, which generally taught that wear resistance is enhanced by using as hard materials as possible for each component.

Without wishing to be tied to a theory, it is believed that the absence of spalling in the lower toughness roller elements of the present invention under the extreme RCF test is due to the difference in hardness of two materials at the contact surface. Typically, when two similar surface contact, there is near point-like (Hertzian) contact conditions. The point-like nature of this contact produces a very high stress which promotes high levels of wear. In contrast, in the present invention, the dissimilarity in the hardness of rings and roller elements produce pseudo-yielding in the softer material at the point of contact. This yielding lowers the contact stress in this area, thereby decreasing the likelihood that the low toughness ball will fail by cone cracking.

It is also noted that conventional silicon nitride processing technology since the time of Rokkaku which has emphasized the flaw size reduction and microstructure homogeneity. See, for example, U.S. Pat. Nos. 5,508,241 and 5,571,760. Because of the overall improvement in these areas, the toughness specifications required by Rokkaku for survival may no longer be needed today to survive in RCF even under extreme operating conditions. In particular, it is believed that if each component has an indentation strength ("IS") fracture toughness of at least 5.0 MPa m$^{1/2}$ and a 4 point flexural strength of at least 800 MPa (typically achieved via a critical flaw size of no more than 25 um), then the bearing assembly will have a much better chance of surviving even the extreme RCF tests.

Moreover, the high wear resistance of the present invention is even more surprising in light of the pseudo-yield contact state produced by the dissimilar materials. The state of pseudo-yield (or "pseudoplasticity") occurs when highly localized stresses produced by extremely high compressive loads create micro-deformations in the body and micro-cracking at one of the contact surfaces. This condition is described clearly in Lee, *J. Am. Cer. Soc.* 81(8) 2061–2070 (1998). Since micro-cracking is associated with progression to macro-cracking, the breakdown of the integrity of the surfaces, and the possible production of third body wear debris, it was thought that producing a pseudo-yield condition could decrease the wear resistance of the bearing.

Rather, the present inventors found that the micro-cracking associated with the pseudo-yield state does not progressively worsen, nor lead to the formation of macro-cracks. The reason for the maintenance of this benign microcracked state appears to lie in the high toughness ($K_{1c} > 6$) of the silicon nitride ring material which resists the exacerbation of surface damage.

Therefore, by creating a pseudo-yield state (by using different hardnesses) and taking care to prevent the expansion of micro-cracks into macro-cracks (by making the ring a high toughness material), the present inventors were able to capture the benefits of the pseudo-yield state (lower contact stresses) while eliminating its wear-related dangers (possible macro-cracking). Since this finding solves a problem which has been long vexing the field of all-ceramic bearings, it represents a remarkable discovery and is therefore a significant contribution to the art.

Moreover, the combination of the present invention also has practical advantages. Because the roller elements are typically spherical balls, and balls are very easy to polish, they will have a very smooth surface finish. In contrast, the ring component of the present invention will have a much coarser surface finish than the balls and therefore be more prone to chipping, cracking and spalling. The higher toughness of the race will help insure against these failure modes. In addition, whereas the roller elements typically experience only a hertzian stress, the race experiences more global, multi-axial stresses than the roller elements. By providing a higher toughness race, the race will be better able to cope with these more significant stresses. It will have better wear (as demonstrated below) because it is better able to prevent wear stemming from the micro-cracking phenomenon discussed above.

Therefore, in accordance with the present invention, there is provided a ceramic bearing comprising an inner ring, an outer ceramic ring having a first fracture toughness, and a plurality of ceramic roller elements having a second fracture toughness, the elements being rollably arranged between the inner and outer rings, wherein the fracture toughness of the outer ring exceeds the fracture toughness of the roller elements.

Preferably, the hardness of the roller elements differs from the hardness of the outer ring (to produce a pseudoplastic yielding). More preferably, the hardness of the roller elements exceeds the hardness of the outer ring by at least 0.5 GPa.

DETAILED DESCIPTION OF THE INVENTION

Figure 1:
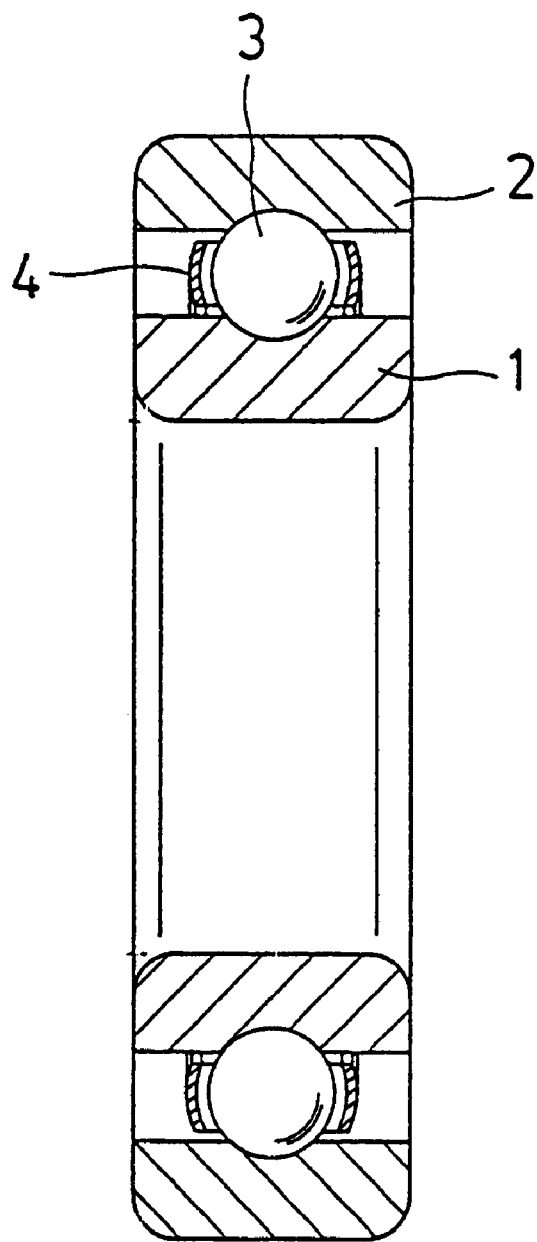
FIG. 1 shows a cross-sectional view of a ceramic bearing according to the present invention.

At least the outer ring possesses a fracture toughness which is higher than that of the roller element material. Preferably, the outer ring comprises at least 80 wt % (preferably at least 90 wt %) silicon nitride. It preferably has an IS fracture toughness of at least 6 MPa m$^{1/2}$ (more preferably, at least 6.5 MPa m$^{1/2}$). In some embodiments, the outer ring has a hardness of no more than about 14.5 GPa, and is generally in the range of about 13.5–14.3 GPa. It preferably has a 4 point flexural strength of at least 900 MPa, more preferably at least 950 MPa. More preferably, it comprises about 80–90 wt % silicon nitride and about 5–10 wt % rare earth oxides (including yttria). It can also include 1–4 wt % alumina. Typically, at least about 50 wt % of the silicon nitride grains have an aspect ratio exceeding 2, which provides high toughness. In some embodiments, the material include about 1 wt % fine TiC having a $D_{50}$ grain size of no more than 0.5 um. In one preferred embodiment, the outer ring is NBD-300™, a silicon nitride material available from Norton Advanced Ceramics, East Granby, Conn.

In some embodiments, the inner ring also possesses a fracture toughness which is higher than that of the roller element material. Preferably, this ring comprises at least 80 wt % (preferably at least 90 wt %) silicon nitride. It preferably has an IS fracture toughness of at least 6 MPa m$^{1/2}$ (more preferably, at least 6.5 MPa m$^{1/2}$). In some embodiments, the outer ring has a hardness of no more than about 14.5 GPa, and is generally in the range of about 13.5–14.3 GPa. It preferably has a 4 point flexural strength of at least 900 MPa, more preferably at least 950 MPa. More preferably, it comprises about 80–90 wt % silicon nitride and about 5–10 wt % rare earth oxides (including yttria). It can also include 1–4 wt % alumina. In some embodiments, the material include about 1 wt % fine TiC having a grain size of no more than 0.5 um. Typically, at least about 50 wt % of the silicon nitride grains have an aspect ratio exceeding 2, which provides high toughness. In one preferred embodiment, the inner ring is NBD-300™, a silicon nitride material available from Norton Advanced Ceramics, East Granby, Conn.

Preferably, the roller elements comprise at least 90 wt % (preferably at least 95 wt %) silicon nitride and are characterized by a low aspect ratio microstructure. Typically, this material has a silicon nitride grain $D_{50}$ of no more than 1 um, preferably no more than 0.6 um. Because of the fine grained size, this material has high strength, high hardness but low fracture toughness. It generally has an IS fracture toughness of about 5–6 MPa m$^{1/2}$ (typically, between 5.3 and 5.7 MPa m$^{1/2}$). In some embodiments, the roller element has a hardness of at least about 15 GPa, and is generally in the range of about 15–16 GPa. It preferably has a 4 point flexural strength of at least 800 MPa (preferably, at least 850 MPa). More preferably, it comprises at least 95 wt % silicon nitride and about 1–3 wt % additives (excluding silica). Typically, these additives comprise about 1–3 wt % MgO. Typically, at least about 50 wt % of the silicon nitride grains have an aspect ratio of less than 2. The relative absence of high aspect ratio grains leads to low toughness. In one preferred embodiment, the roller elements are NBD-200™, a silicon nitride material available from Norton Advanced Ceramics, East Granby, Conn. This material is generally described in U.S. Pat. No. 5,508,241, the specification of which is incorporated by reference.

In preferred embodiments of the present invention, the fracture toughness of at least the outer ring (and preferably the inner ring as well) exceeds the fracture toughness of the roller elements by at least 0.5 MPa $m^{1/2}$, more preferably at least 1 MPa $m^{1/2}$.

In another preferred embodiment, the hardness of the roller element exceeds that of at least the outer ring (and preferably the inner ring as well) by about 0.5 GPa, preferably at least 1 GPa.

Now referring to FIG. 1, there is provided a ceramic bearing comprising an inner ring 1, an outer ring 2, and a plurality of balls 3 as roller elements rollably arranged between the inner ring 1 and the outer ring 2, and retainer 4. Each of inner ring, outer ring and roller elements are made of ceramics, preferably silicon nitride. The toughness of the outer ring (and preferably that also of the inner ring) exceeds that of the roller elements.

For the purposes of the present invention, the hardness of a material is measured by Vickers diamond pyramid hardness indentations from 10 kg loads. Fracture toughness is determined by the fracture of 4 point bend specimens of 3×4×50 mm containing a Vickers indentation (10 kg load) on the tensile surfaces within the inner span, at a crosshead speed of about 0.5 mrn/min, according to procedures described by P. Chantikul et al., in "A Critical Evaluation of Indentation Techniques for Measuring Fracture Toughness II: Strength Methods", *J. Am. Ceram. Soc.* 64(9), pp. 539–544 (1981). However, for two materials (200M and 300G), toughness was determined by ICL toughness, according to procedures described by Anstis et al., "A Critical Evaluation of Indentation Techniques for Measuring Fracture Toughness: I. Direct Crack Measurements", *J. Amer. Cer. Soc.*, Vol. 64, No. 9, September 1981, and the IS fracture toughness was calculated through interpolation via IS values for two other materials (300 and 200). The 4-point flexure strength of the ceramics of the present invention were also determined. 3×4×50 mm type B specimens on a 40 mm outer span and a 20 mm inner span test jig (ASTM C1161–90) were selected.

EXAMPLE

Rods and balls made of various grades of silicon nitride were selected for examination. The 200 a nd 300 materials are commercially available bearing quality materials. The 200M material was essentially the NBD-200 material discussed above modified with about 1 wt % fine TiC addition. The 300G material was essentially the NBD-300 material discussed above, modified with a more fine, lower aspect ratio microstructure.

The mechanical properties of the various silicon nitride materials involved in the testing were as follows:

|  | IS Toughness (MPa $m^{1/2}$) | 10 kg Hardness (GPa) | Flex. Strength (MPa) |
| --- | --- | --- | --- |
| NBD-200 | 5.5 | 15.4 | 800 |
| NBD-200M | ~6.2 | 15.5 | NT |
| NBD-300G | ~6.4 | 14.6 | 960 |
| NBD-300 | 7.0 | 14.2 | NT |

In general, the toughness of these silicon nitride materials varies inversely with the hardness of the materials.

These materials were then subjected to rolling contact fatigue (RCF) tests, specifically the accelerated bearing test procedure described in ASTM-STP 771. This test procedure applies contact pressure higher than that normally encountered in service in order to accelerate the fatigue failure of the test material. In carrying out the RCF test for the present invention, three slave balls made of various grades of silicon nitride (polished to a surface roughness Ra of less than 8 um) were loaded against a rod also made of various grades of silicon nitride (and polished to a surface roughness Ra of less than 8 um) at an average contact stress of about 6.4 GPa. The rod was rotated at about 3600 rpm with an electric motor. Both the slave balls and the rod were lubricated with lubricating oil supplied by a drip feeder at a rate of about 8 drops per minute. The test produced circumferential fatigue/wear tracks in the rod which were about 0.1 inches in width. The silicon nitride of the present invention displayed normal failure modes and uniform wear.

The results of the RCF tests are shown in Table I below:

TABLE 1

| Rod | Ball | # Cycles ($10^6$) | Δ Ball ($10^{-4}$ g) | Δ Rod ($10^{-4}$ g) | # Spalls | Wear/Cycle (umx $10^{-6}$) |
| --- | --- | --- | --- | --- | --- | --- |
| Comparative Examples of low toughness components | | | | | | |
| 200 | 200 | 29 | 46 | 17 | 2 | <0.3 |
| Comparative Examples of lower toughness rods (as per Rokkaku) | | | | | | |
| 200 | 300 | 31 | 18 | 6 | 0 | 0.29 |
| 300G | 300 | 31 | 2 | 8 | 0 | 0.48 |
| Comparative Examples of low hardness, high toughness rods and balls (Takebayashi) | | | | | | |
| 300 | 300 | <30 | 11 | 2 | 0 | 0.067 |
| Examples of the Present Invention (First Embodiment of higher toughness rods) | | | | | | |
| 200M | 200 | 34 | 62 | 11 | 0 | 0.14–.29 |
| 300 | 200 | 62 | 8 | 8 | 0 | 0.016 |

In the initial comparative example (200/200), each was a low toughness material, high hardness material, and their RCF lives were limited by spalling in the ball. It is believed that the reason for the spalling was the identity of materials (producing high point contact stress) and the low toughness (5.5) of the ball. The high wear rate is believed to be due to the low toughness (5.5) of the rod. This demonstrates the need to have a race with a toughness of greater than 6.0 MPa $m^{1/2}$.

In the second comparative example (200/300), the ball of the first test was replaced with a high toughness, low hardness material in order to replicate the Rokkaku teaching. Although no spalling occurred, the depth of the rod wear rate was high (>10 times that of the best mode). It is believed that RCF survival was due in part to the hardness difference (1.2 GPa) between the materials. It is believed that the large depth of the wear track was caused by the low toughness (5.5) of the rod material. It is also possible that third body debris initially generated by the low toughness rod caused later more significant wear in the ball. This demonstrates the need to have a race with a toughness of greater than 6.0 MPa $m^{1/2}$.

In the third comparative (300G/300), the high toughness rod of the best mode 300/200 example was replaced by a rod having lower fracture toughness. The wear track depth increased dramatically. It is believed that the low toughness of the rod material (~6.4) caused the high wear rate. This demonstrates the need to have a race with a toughness of greater than 6.5 MPa $m^{1/2}$.

In the fourth comparative example (300/300), both the ball and rod were high toughness, low hardness materials. Although each component survived RCF testing, the wear track depth per cycle of the test ($0.067 \times 10^{-6}$) was 4 times greater than that of the best mode (0.016). It is believed that both the absence of pseudo-plastic contact (owing to the identity of material and the absence of a hard surface (Hv>15 GPa) contributed to the high wear rate. This demonstrates the need for a ball material having a hardness greater than about 15 GPa, and a combination having a hardness difference of at least 0.5 GPa.

In the first example of the present invention (200M/200), the low toughness 200 rod of the 200/200 test was replaced by 200M, which has a 13% higher toughness. The RCF test demonstrated no spalling and the wear track depth was reduced by a factor of 2. This demonstrates the RCF and wear advantage of using a higher toughness ring material (as the hardness difference between the two materials (0.2 GPa) was somewhat low). Nonetheless, in comparison to the best mode, the actual wear rate is somewhat high due to the low absolute value of the toughness (~6.2) of the rod, and the low hardness difference. This demonstrates the need to have a race with a toughness of greater than 6.5 MPa $m^{1/2}$ and the need for a hardness difference of more than 0.5 GPa In the second example of the present invention (300/200), the best mode, the ball is a low toughness, high hardness silicon nitride and the rod is a high toughness, low hardness silicon nitride. The RCF test demonstrated no spalling and the wear track depth was reduced by a factor of 10 over all other examples. This demonstrates the advantage of using an even higher toughness ring material.

We claim:

1. A ceramic bearing comprising an inner ring, an outer ceramic ring having a first fracture toughness, and a plurality of ceramic rolling elements having a second fracture toughness, the elements being rollably arranged between the inner and outer rings, wherein the fracture toughness of the outer ring exceeds the fracture toughness of the rolling elements.

2. The bearing of claim 1 wherein the fracture toughness of the outer ring is at least 6 MPa $m^{1/2}$.

3. The bearing of claim 2 wherein the hardness of the rolling elements is greater than the hardness of the outer ring by at least 0.5 GPa.

4. The bearing of claim 3 wherein the hardness of the rolling elements is at least 15 GPa.

5. The bearing of claim 4 wherein the outer ring comprises at least 80 wt % silicon nitride, and the rolling elements comprise at least 90 wt % silicon nitride.

6. The bearing of claim 4 wherein the hardness of the outer ring is no more than 14.5 GPa.

7. The bearing of claim 4 wherein the fracture toughness of the outer ring exceeds the fracture toughness of the rolling elements by at least 0.5 MPa $m^{1/2}$.

8. The bearing of claim 4 wherein the fracture toughness of the outer ring is at least 6.5 MPa $m^{1/2}$.

9. The bearing of claim 4 wherein the inner ring is ceramic having a third fracture toughness, and wherein the fracture toughness of the inner ring exceeds the fracture toughness of the rolling elements by at least 0.5 MPa $m^{1/2}$.

10. The bearing of claim 1 wherein each of the rolling elements and the outer ring is characterized by a toughness of at least 5 MPa $m^{1/2}$ and a 4 point flexural strength of at least 800 MPa.

11. A ceramic bearing comprising a ceramic inner ring, an outer ring having a first fracture toughness, and a plurality of ceramic rolling elements having a second fracture toughness the elements being rollably arranged between the inner and outer rings, wherein the fracture toughness of the inner ring exceeds the fracture toughness of the rolling elements.

* * * * *